Jan. 17, 1967 L. B. GREEN ET AL 3,299,275

MEASURING SURFACE TEMPERATURES OF ABLATING MATERIALS WITH THERMOCOUPLE AND PHOTOCELL

Filed Aug. 14, 1963 2 Sheets-Sheet 1

INVENTORS.
LEWIS B. GREEN
DALE A. KLEPPIN
BY
L E Carnahan
AGENT

INVENTORS
LEWIS B. GREEN
DALE A. KLEPPIN
BY
L E Carnahan
AGENT

United States Patent Office 3,299,275

Patented Jan. 17, 1967

3,299,275

MEASURING SURFACE TEMPERATURES OF ABLATING MATERIALS WITH THERMOCOUPLE AND PHOTOCELL

Lewis B. Green and Dale A. Kleppin, Bellevue, Wash., assignors to The Boeing Company, Seattle, Wash., a corporation of Delaware Filed Aug. 14, 1963, Ser. No. 302,016
13 Claims. (Cl. (250—222)

This invention relates to erosion sensors, and more particularly to a method of detecting the surface temperature and rate of erosion of a body of ablating material, and apparatus for carrying out the same.

Missiles, re-entry vehicles, spacecraft, etc., are protected from boost and re-entry heating by ablating insulation materials which erode when exposed to high heating rates. To determine the amount of ablation material required for protection against a given thermal environment, it is necessary to know the temperature of the ablating surface.

High heating rates are produced in the laboratory by means of arc-jets, plasma jets, radiant lamps, or arc-imaging furnaces. The first two types of facilities produce convective heating environments. They are really wind tunnels using electrically heated air which flows over or past a material specimen. The latter two provide high radiant heating rates.

Previous attempts to measure surface temperatures of specimens tested in the above stated facilities have been inconclusive.

Radiation pyrometers have been used, but were only partially successful. These instruments are inaccurate at low temperatures and measurements are subject to errors from arc surface reflections, non-black body effects, and random radiation.

Specimens with thermocouples buried beneath the surface have been exposed to convective heating in arc-jets and during missile silo launches. Temperatures were continuously recorded during the tests. In theory, an abrupt change in recorded temperature should occur when the ablating surface recedes down to the thermocouple. The temperature measured at that time would be that of the surface. Results were questionable, however, because the recorded temperature curves had no abrupt changes and the correct time to read the temperature was subject to individual interpretation.

This invention provides a novel and accurate technique for measuring the surface temperature of an ablating material. Briefly, the invention utilizes a radiant energy sensitive device to indicate instantly when the material has ablated to a predetermined depth. The temperature recorded by a thermocouple mounted at this same depth can be read at the time indicated by the radiant energy sensitive device to determine the surface temperature of the material.

Therefore, an object of this invention is to provide an accurate method of measuring the surface temperature of an ablating material.

A further object of the invention is to provide apparatus for carrying out the above stated method.

Another object of the invention is to provide a method and apparatus for detecting a predetermined depth of erosion of ablating material and temperature sensitive means for determining the surface temperature at said predetermined depth.

Other objects of the invention not specifically set forth above will become readily apparent from the following description and drawing in which.

Figure 1:
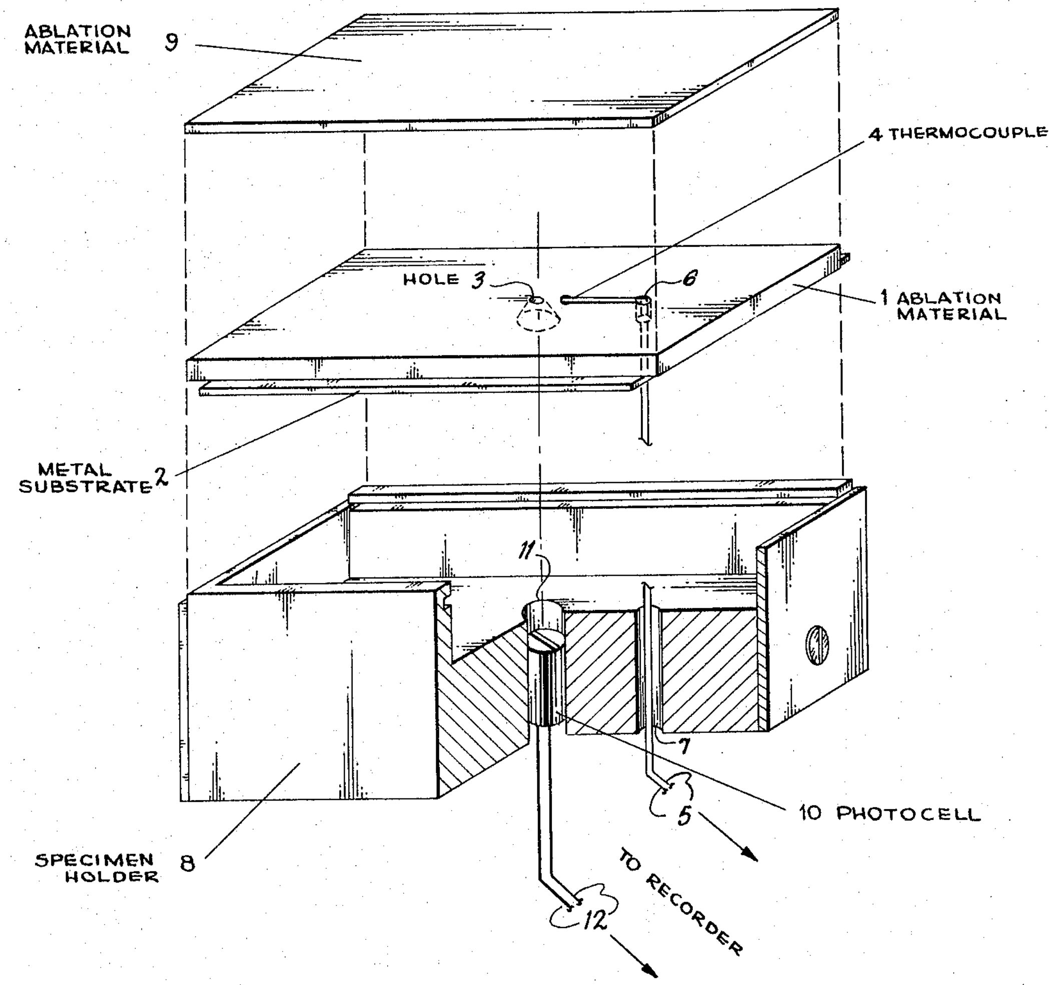
FIG. 1 is an exploded view partially in cross-section of an embodiment of the invention.

Test specimens are assembled as illustrated in FIG. 1 and must be designed to meet the requirements of the facility or vehicle used. The sensor comprises a sheet of ablation material 1 which is bonded to a metal substrate 2, which size and shape is compatible with the test facility. A small hole 3, approximately $\frac{1}{16}$ inch in diameter, is drilled through substrate 2 and ablation material 1 normal to the surface thereof and countersunk, as shown. The hole 3 should be located in an area on the specimen where the gas flow is steady and the heating uniform. A small (0.001–0.003 in.) diameter wire thermocouple 4 is located on the surface of material 1 with its junction close to hole 3. Leads 5 from thermocouple 4 are run through a potted hole 6 in ablation material 1 and substrate 2 and out through a passageway 7 in specimen holder 8 to a recorder mechanism as indicated by legend.

A second sheet of ablation material 9 is bonded onto material 1 by any known method and over hole 3 and thermocouple 4. A radiant energy sensitive device such as photocell 10 is inserted into a passageway 11 drilling through the bottom of specimen holder 8. Leads 12 from photocell 10 run to a recorder mechanism as indicated by legend. The specimen is mounted on holder 8 and the holder is sealed, if necessary, to make it light tight.

Figure 2:
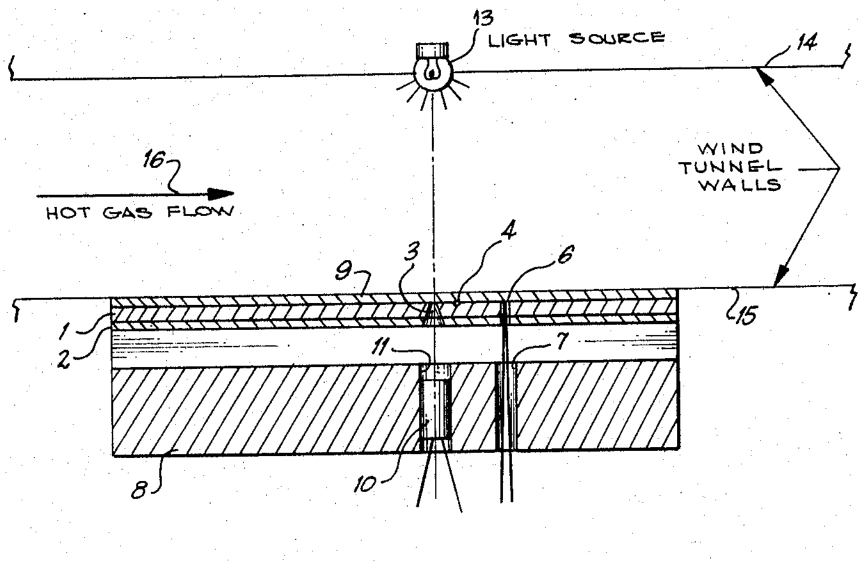
FIG. 2 is schematic of a wind tunnel utilizing the invention.

A typical test arrangement is shown schematically in FIG. 2. A light source 13 is positioned in an upper wall 14 of a wind tunnel and located opposite photocell 10 of the FIG. 1 test specimen which is positioned in a lower wall 15 of the tunnel so that light source 13 is aligned with hole 3 in the specimen and with the sensing face of the photocell 10. Light source 13 is necessary only if sufficient normal light is unavailable.

As hot gas indicated by arrow 16 from a source such as an arc-jet (not shown) heats the surface of the specimen, the top layer or sheet 9 of ablation material ablates away and exposes hole 3. This allows light from light source 13 to strike photocell 10. The photocell 10 output rises to a constant full scale value almost instantaneously. At this time thermocouple 4 will be indicating the surface temperature of sheet 1. At this time. it is also known how much material has been ablated.

Figure 3:
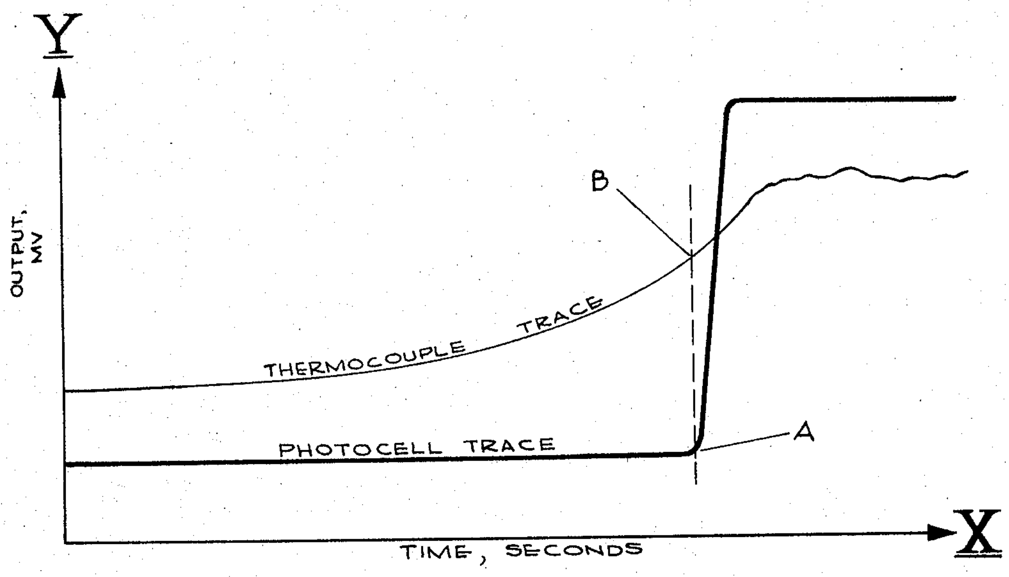
FIG. 3 is a graph showing typical test data when utilizing the invention.

FIG. 3 represents data from a typical arc-jet test showing thermocouple and photocell traces as indicated by legends. In FIG. 3, the X axis represents time in seconds which the Y axis represents output in milli-volts.

As clearly shown in FIG. 3, photocell 10 indicates no output until hole 3 is exposed at point A. The surface temperature is read at point B; i.e., the point at which the photocell first responds, as shown by the dash line, thus accurately indicating the surface temperature at the time that sheet 9 of the ablation material has been eroded away by the hot gas.

It has thus been shown that this invention provides a simple, reliable and accurate method of determining surface temperatures of ablating materials. By utilizing the method and apparatus of this invention, the test data requires no subsequent analytical work involving questionable assumptions. The apparatus is inexpensive and only minor changes need be made for different test facilities.

While the description has been directed toward specific test facilities, the invention may be adapted for use in all test facilities as well as full scale flight tests. In addition, an instrument having several holes, photocells, and thermocouples at different known levels could be utilized as an erosion rate sensor (ablation meter).

Although a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What we claim is:

1. Mechanism for measuring the surface temperature of ablating material subjected to heating from the flow of hot gas or the like comprising a first layer of ablating material operatively attached to a metal substrate, said first layer of material being provided with a hole therethrough, temperature sensitive means positioned on the surface of said first layer and adjacent said hole, a second layer of ablating material positioned over said first layer and covering said hole and said temperature sensitive means, support means for said materials, radiant energy sensitive means positioned in said support means and in alignment with said hole, and means adapted to interconnect said temperature and radiant energy sensitive means with recording means, whereby said second layer of ablating material is eroded away by heating thus allowing radiant energy to pass through said hole onto said radiant energy sensitive means while said temperature sensitive means indicates the temperature of said material at said hole.

2. The mechanism defined in claim 1 wherein said temperature sensitive means is a thermocouple.

3. The mechanism defined in claim 1 wherein said radiant energy sensitive means is a photocell.

4. A process for making a temperature determination of an ablating material, said process comprising:

(a) providing an ablating material with a hole formed partially therethrough to a predetermined depth, (b) locating a temperature-sensitive mechanism at a predetermined depth in said ablating material at a location proximate said hole, (c) locating said ablating material between a light source and a light-sensitive mechanism in a manner that said hole is aligned with said light-sensitive mechanism, (d) supplying heat to cause ablation of said material at least at the location of said hole, (e) making a temperature determination through said temperature-sensitive mechanism in accordance with an activation of said light-sensitive mechanism caused by said light source transmitting light to said light-sensitive mechanism when said material becomes ablated away at the location of said hole.

5. The process as recited in claim 4, wherein said temperature determination is made by placing a thermocouple in said ablating material, with a junction of said thermocouple being located proximate said hole.

6. The process as recited in claim 4 characterized by placing said temperature-sensitive mechanism in said ablating material at the same depth as said hole, whereby a determination of surface temperature of said ablating material can be achieved.

7. The process as recited in claim 6, wherein said ablating material is provided with said hole therein and with said temperature-sensitive mechanism therein, by providing a first and second layer of said material, providing a hole in said second layer, and placing said layers together with said temperature-sensitive mechanism between said two layers.

8. The process as recited in claim 7, characterized by providing a thermocouple as said temperature-sensitive mechanism and placing said thermocouple with a junction thereof located proximate said hole, and placing leads of said thermocouple so that a portion of said leads proximate said junction reach from said junction between said layers to an exit area of said material.

9. An apparatus for making a temperature determination, said apparatus comprising:

(a) an ablating material arranged to receive heat to ablate said material, (b) said ablating material having a hole formed partially therethrough to a predetermined depth, (c) a light source, (d) a light-sensitive mechanism, (e) support means to locate said ablating material between said light source and said light-sensitive mechanism, with a hole in alignment with said light source and said light-sensitive mechanism, and (f) temperature-sensitive means located in said ablating material at a predetermined depth, said temperature-sensitive means being proximate said hole.

10. The apparatus as recited in claim 9, wherein there is indicating means operatively connected to said temperature-sensitive means and to said light-sensitive mechanism, whereby a temperature determination is made in accordance with activation of said light-sensitive mechanism caused by light being transmitted thereto when said material is ablated away at the location of said hole.

11. The apparatus as recited in claim 9, wherein said temperature-sensitive means is located in said material at the same depth as said hole.

12. The apparatus as recited in claim 11, wherein said material comprises adjacent first and second layers, said second layer having a through hole therein, with said temperature-sensitive means being between said first and second layers.

13. The apparatus as recited in claim 12, wherein said temperature-sensitive means comprises a thermocouple, a junction of which and a proximate portion of leads thereof are located between said layers, with said junction being proximate said hole.

References Cited by the Examiner

UNITED STATES PATENTS

| | | | |
|---|---|---|---|
| 3,018,663 | 1/1962 | Dunlop. | |
| 3,117,233 | 1/1964 | Mittelberger et al. ---- | 250—222 |

RALPH G. NILSON, *Primary Examiner.*

J. D. WALL, *Assistant Examiner.*